Aug. 22, 1944. A. F. H. PONCET 2,356,613
MERCURY AMPEREHOURMETERS
Filed Jan. 21, 1942

INVENTOR
A.F. H. PONCET
BY
Young, Emery + Thompson
ATTYS.

Patented Aug. 22, 1944

2,356,613

UNITED STATES PATENT OFFICE 2,356,613

MERCURY AMPERE-HOUR-METER

André François Henry Poncet, Paris, France; vested in the Alien Property Custodian Application January 21, 1942, Serial No. 427,649
In France February 25, 1941

2 Claims. (Cl. 171—34)

The present invention relates to mercury amperehourmeters used for indicating at any moment the amount of electricity available in a storage battery during its discharge period. Such amperehourmeters usually comprise a mercury trough containing a motor disc rotating between two electrodes for the supply of current.

The motor of the amperehourmeter, inserted in the battery circuit, rotates in one or the other direction according as to whether the battery is being charged or discharged. During the charge, the amperehourmeter gives increasing indications and records the number of stored amperehours. During discharge, it will give decreasing indications corresponding to the decreasing number of amperehours available in the battery.

Since the average efficiency of the battery is always less than unity, the indicating members of the amperehourmeter must, for currents equal in absolute value, rotate faster during discharge than during charge.

On the other hand, the efficiency of the battery does not remain constant. Its capacity will vary indeed with the rate of discharge the battery is being subjected to, and also with the temperature.

The present invention concerns improvements to amperehourmeters for compensating the variations in capacity of a storage battery according to the surrounding temperature and according to the rate of discharge.

According to the invention, the amperehourmeter motor is placed under the control of a member sensitive on one hand to the variations of the surrounding temperature, and on the other, to the variations of the current flowing through the battery circuit.

According to one embodiment of the invention, one of the supply electrodes of the amperehourmeter is movable and placed under the control of members deformable by heat, such as devices of the bi-metal or thermo-sensitive strip type.

The electrode is preferably rotatable and the controlling thermosensitive strips are embodied in the form of spirals or coils, the axis of which coincides with the axis of the desired rotation.

For effecting the required corrections, indicated above, two thermosensitive strips, acting in opposite directions to one another, are subjected, one to the surrounding temperature, and the other, directly or not, to the heating effect due to the discharge current or to a suitable fraction of the latter.

A preferred embodiment of the invention is shown by way of example in the annexed drawing in which.

Figure 1:
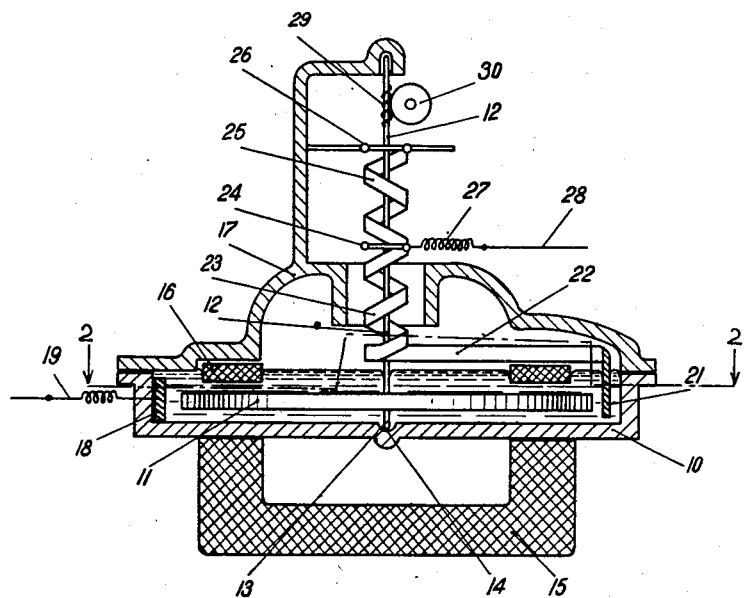
Fig. 1 is an elevational section of the improved amperehourmeter.

The apparatus shown on the drawing comprises a horizontal trough 10 containing mercury, in which is rotatable a disc 11 of a metal which is a good conductor of electricity; the disc is carried by a shaft 12 terminated at its lower end by a pivot pin 13 resting in a cup bearing 14 provided at the centre of the trough.

Beneath the trough which is made of a non-magnetic substance, is arranged a core 15 of a permanent magnet or a permanently excited electromagnet. Above the pole pieces of said core and at the upper part of the trough is fixed an annular armature 16 causing the magnetic flux to pass perpendicularly through two diametrically opposed regions of the disc 11.

The trough 10 is covered by a cup 17 arranged in the known manner for preventing to upset the mercury when the apparatus is being transported in any position.

At the inner periphery of the trough is arranged a fixed electrode 18 connected to a conductor 19 belonging, directly or not, to the discharge circuit of the metered battery. Another electrode, 21, also immersed in the mercury, is arranged at the end of an arm 22 extending horizontally and terminating at the lower end of a thermosensitive strip wound as vertical coil 23 around the shaft 12 of disc 11, but without contact with the latter. The strip is fixed by its upper part to a conducting ring 24 which is itself attached to the lower end of a second thermosensitive strip 25 suspended to a post 26 carried by the cup 17. This second strip is adapted, either by its constitution or by the direction in which it is wound, to act in the direction opposite to the first when its temperature is being increased.

The conducting ring 24 is connected by a very flexible connection 27 to a conductor 28 closing the circuit of the apparatus.

The shaft 12 is formed near its upper end as a screw 29 which drives the primary pinion 30 of a gear adapted to indicate the number of amperehours still available in the battery.

Figure 2:
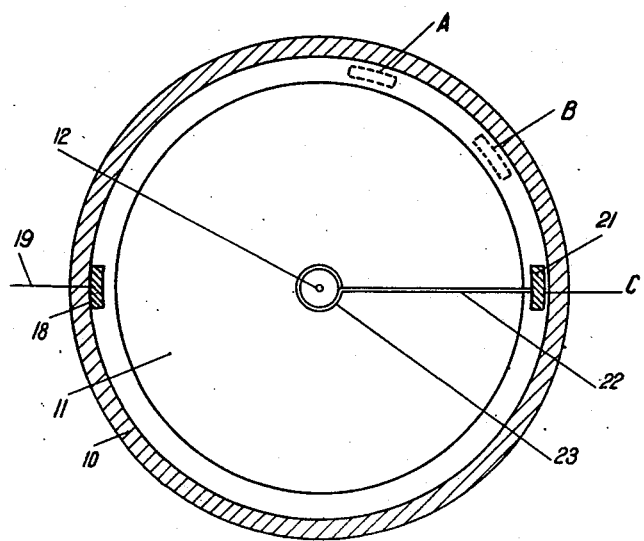
Fig. 2 is a sectional view taken on the line 2—2 of Fig. 1 and showing the mercury trough and the enclosed members.

The thermosensitive strips 25 and 23 are arranged in a manner that at rest and when the surrounding temperature is high, the movable electrode 21 is in the swung out position shown in A on Figure 2, in which the path of the electric current in the disc will cut only partially the field flux set up by the magnet or electromagnet.

When a moderate discharge current flows, causing no decrease in the battery capacity, the disc will rotate at a given speed and the complete record of the supplied amperehours will give the value of the amperehours still available.

If the discharge current is increased, the battery capacity will be correspondingly decreased, but the lower thermostrip 23, passed by said current or a fraction of it, will be heated by Joule's effect and the movable electrode 21 will rotate until it occupies a position which is for instance that indicated by B, thus setting up a different distribution of the current lines in the disc with respect to the field flux, thereby causing the disc to rotate faster and thus indicate a number of remaining amperehours with due consideration of the decrease of the battery capacity and corresponding to the amperehours effectively available.

Likewise, if the surrounding temperature decreases, the effective capacity of the battery is correspondingly decreased, but the upper thermostrip 25, subjected to said temperature, will change in shape and rotate the thermo-strip 23 together with the movable electrode 21 towards position A, in which the disc will rotate comparatively faster than before, thus accounting for the decrease of the battery capacity in the indication of the remaining amperehours.

The apparatus is, of course, calibrated in a manner that position C corresponds to the strongest discharge current and to the highest surrounding temperature foreseen.

When a decrease of current or an increase in the outer temperature, or both, are set up, the movable electrode 21 will move towards the initial position C by an amount corresponding to the ratio between the effective and rated capacity of the battery, with due consideration, of course, to the amperehours already consumed and the previous discharge conditions.

Thus, due to the improvements according to the invention, the apparatus will correctly perform its function as a meter and prevent any false indications in the use of the battery, especially when the latter actuates the motors of an electric vehicle which has to be returned periodically to the charging station.

The invention is, of course, not limited to the example described, and it is possible, without departing from its general scope, to perform any desirable constructional alterations; thus, the thermosensitive strips, instead of being wound as coils, could be arranged as spirals.

The apparatus could further comprise, either in addition to the thermo-strip 23 or instead of the latter, an electromagnetic compensating device acting upon the field flux in terms of the rate of discharge.

I claim:

1. An ampere hour meter for indicating the capacity of a storage battery comprising a trough containing a pool of mercury, a disc of conducting material mounted to rotate in said pool, indicating means actuated by said disc, means for creating a magnetic flux through said disc transversely thereto, a fixed electrode and a movable electrode circumferentially spaced from each other about said disc and arranged to convey battery current in a determined path through said disc to rotate the same by coaction with said magnetic flux, means responsive to variation of battery current strength, and means responsive to variation of ambient temperature, each of said responsive means tending to vary the position of said movable electrode and the path of said current oppositely on increases of current and ambient temperature, and on decreases of current and ambient temperature.

2. An ampere hour meter according to claim 1 wherein each of the responsive means includes a coiled thermostatic element coaxial with the rotary disc and connected to the movable electrode.

ANDRÉ FRANÇOIS HENRY PONCET.